8331X
P. Daris,
Steam-Boiler Furnace,
Patented July 29, 1834.
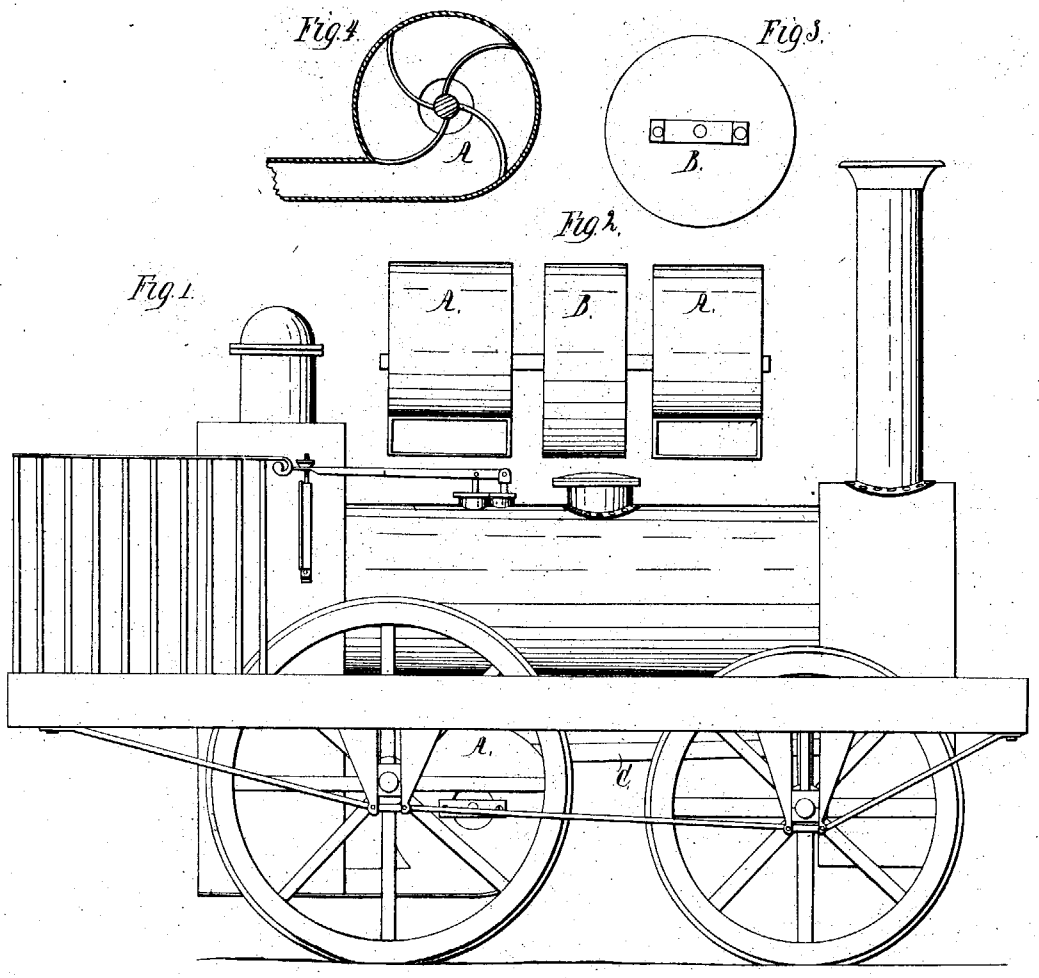

Phineas Davis, Baltimore, Maryland

[illegible]

Letters Patent July 29. 1834

The schedule referred to in these Letters Patent and making part of the
same containing a description in the words of the said Phineas Davis himself
of his improvement in the mode of promoting the combustion of Anthra-
cite coal, and other fuel in the furnaces of locomotive & other Steam Engines
Be it known to whomsoever it may concern that I Phineas Davis of
Baltimore in the State of Maryland have invented a new mode of pro
moting the combustion of anthracite and other fuel in the furnaces or
fire places of Locomotive and other Steam Engines; and that the follow
ing is a full and exact description of my said invention.

The means by which I promote the combustion of Anthracite and
other fuel is by the employment of fan wheels or vanes revolving within
drums in a manner well known to machinists and my improvement
consists in the arrangement of the apparatus by which I employ the
waste or escape steam to give motion to such fans or vanes. In a loco
motive engine I usually employ two fan wheels and I have found
them and their appendages to answer well in practice when made of
the dimensions I am about to indicate although in this particular
there may be considerable variation without injury to the effect.
The wheels may be from 18 to 20 inches in diameter and from 10 to 12
inches wide they may be placed upon the same axis and at the distance
of about 18 inches from each other in the clear in many instances two
vanes to each wheel will be sufficient, but a greater number may
be used; the drums within which the wheels revolve do not differ from those
ordinarily employed in similar blowing machines. The wind is conduc
ted from these drums through tubes some eight inches square which
lead from them in the direction of a tangent to the circle described by
the wheels, into a tight ash pit under the grate of the furnace and the
air is thereby forced through the fuel, with such velocity as to cause the
fire to burn with great energy so as to produce an abundant supply of steam

8331X from anthracite notwithstanding the tendency of that fuel to pack and thereby to impede the ordinary draft when employed for locomotive engines. In order to give motion to the fan wheels I place a steam wheel upon the same shaft with them generally at the centre thereof so as to be equidistant from them. This steam wheel is constructed in the same manner nearly as the wind wheels differing from them principally in its dimensions and its being acted upon and impelled by an elastic fluid (Steam) whilst they act upon and impell an elastic fluid (air). The steam wheel has usually four wings or vanes of from three to five inches in width, and it may be from 20 to 24 inches in diameter. The wheel is inclosed within a drum of such dimensions as just to allow the vanes to revolve freely within it. A tube connected with the exhaust pipe from each side of the Cylinder enters this drum tangently and the waste steam is thus injected forcibly against the extreme ends of the vanes impelling them and consequently the wind wheels with great velocity. The steam which thus enters escapes at an opening or openings in the centre of the drum made similar to those at which the air enters from the action of and to supply the fan wheels.

As it is necessary to command the blast so as to regulate the intensity of the fire which would often be too great were the whole of the waste steam discharged upon the steam wheel I attach a branch pipe to that which conducts the steam from the Cylinder or Cylinders to the steam wheel and employ a valve or valves so arranged as to enable me to direct the whole or any desired portion of the steam through such branch pipe, and thus obtain the desired object in the most perfect manner. The continued fresh supply of steam and the diminished centrifugal force of that which has acted upon the vanes combine here as to operate until the moment of its escape at the openings surrounding the centre provided the parts are properly proportioned to each other in although its energy is diminished as also is the actual velocity of the vanes as the centre is approached.

The openings in the steam wheel for the escape of steam

I usually make on one side only and cover this with a cap or drum and
from this cap or drum a tube extends upwards to carry off the steam in
such a way that no inconvenience may be experienced by its discharge.
Although I intend always to use the waste steam from the cylinder or cylin-
-ders it is manifest that steam may be supplied from the boiler to act upon
the steam wheel but this procedure would not be economical and would
yet be a manifest invasion of my rights, I am aware that wind wheels
such as I have described have been used to supply a blast to the furnaces of
locomotive engines I am also aware that wheels have been propelled by
the action of steam upon wings or vanes surrounding them. I do not
therefore claim either of these singly and separately as my invention but
what I do claim is the combination and arrangement of the parts such
as I have described, by which the waste or escape steam is made to
act upon vanes revolving within a drum for the purpose of giving mo-
-tion to wind wheels to feed the furnaces of steam engines. And I do
hereby declare that I have herein explained and set forth what I
believe to be the best method of applying the waste steam to accomplish
the proposed object but that I do not intend thereby to confine myself
to this precise mode of construction and arrangement but to vary
the same as I may find convenient whilst I operate upon the same
principle and attain a like end by analogous means, Witnesses
William Warfield
John A Brown Phineas Davis Drawing 1092 words Engd.
[illegible]